(12) United States Patent
Vash et al.

(10) Patent No.: US 8,769,211 B2
(45) Date of Patent: Jul. 1, 2014

(54) MONITORING THREAD SYNCHRONIZATION IN A DISTRIBUTED CACHE

(75) Inventors: James R. Vash, Littleton, MA (US); Bongjin Jung, Westford, MA (US); Rishan Tan, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 840 days.

(21) Appl. No.: 12/644,506

(22) Filed: Dec. 22, 2009

(65) Prior Publication Data

US 2011/0153948 A1 Jun. 23, 2011

(51) Int. Cl.
*G06F 12/00* (2006.01)
*G06F 13/00* (2006.01)
*G06F 13/28* (2006.01)
*G06F 9/46* (2006.01)
*G06F 1/00* (2006.01)
*G06F 1/26* (2006.01)
*G06F 1/32* (2006.01)

(52) U.S. Cl.
USPC ........... 711/144; 711/140; 711/141; 711/146; 718/102; 718/100; 718/108; 713/300; 713/320; 713/323

(58) Field of Classification Search
None
See application file for complete search history.

(56) References Cited

U.S. PATENT DOCUMENTS

| | | | | |
|---|---|---|---|---|
| 5,961,584 A * | 10/1999 | Wolf | | 718/103 |
| 7,225,300 B1 * | 5/2007 | Choquette et al. | | 711/146 |
| 8,386,822 B2 * | 2/2013 | Arimilli et al. | | 713/323 |
| 2007/0156971 A1 * | 7/2007 | Sistla et al. | | 711/141 |
| 2009/0172284 A1 * | 7/2009 | Offen et al. | | 711/125 |
| 2011/0173631 A1 * | 7/2011 | Arimilli et al. | | 718/108 |

\* cited by examiner

*Primary Examiner* — Jae Yu
*Assistant Examiner* — Marwan Ayash
(74) *Attorney, Agent, or Firm* — Blakely, Sokoloff, Taylor & Zafman LLP (57) ABSTRACT

Systems, apparatus, and method of monitoring synchronization in a distributed cache are described. In an exemplary embodiment, a first and second processing core process a first and second thread respectively. A first and second distributed cache slices store data for either or both of the first and second processing cores. A first and second core interface co-located with the first and second processing cores respectively maintain a finite state machine (FSM) to be executed in response to receiving a request from a thread of its co-located processing core to monitor a cache line in the distributed cache.

12 Claims, 7 Drawing Sheets

Figure 1

| Data 201 | Core Valid Bits 203 | | | | | | | |
|---|---|---|---|---|---|---|---|---|
| | 0 | 1 | 2 | 3 | 4 | 5 | 6 | 7 |
| Data_0 | 0 | 0 | 0 | 1 | 0 | 0 | 0 | 0 |
| Data_1 | 0 | 1 | 1 | 0 | 0 | 0 | 0 | 0 |
| Data_2 | 0 | 0 | 0 | 0 | 0 | 0 | 0 | 0 |
| Data_3 | 0 | 0 | 0 | 0 | 0 | 0 | 0 | 0 |
| Data_4 | 0 | 0 | 0 | 0 | 0 | 0 | 0 | 0 |
| Data_5 | 0 | 0 | 0 | 0 | 0 | 0 | 0 | 0 |
| Data_6 | 0 | 0 | 0 | 0 | 0 | 0 | 0 | 0 |
| Data_7 | 0 | 0 | 0 | 0 | 0 | 0 | 0 | 0 |

Cache Slice 107

MONITORING THREAD SYNCHRONIZATION IN A DISTRIBUTED CACHE

FIELD OF THE DISCLOSURE

This disclosure relates generally to the field of microprocessors. In particular, the disclosure relates to efficiently implementing MONITOR instructions in a distributed cache architecture.

BACKGROUND OF THE DISCLOSURE

Modern high-performance microprocessors can have a number of execution cores and multiple levels of cache storage. Thus there is an ever increasing demand for higher interconnect bandwidth between these components. One technique to provide such higher interconnect bandwidths involves distributed cache partitioning with parallel access to multiple portions of the distributed cache through a shared interconnect.

Another aspect of some modern high-performance microprocessors includes multithreaded software and hardware, and thread synchronization through shared memory. An example of two instructions to provide thread synchronization through shared memory would be the MONITOR and the MWAIT instructions of Intel Corporation's SSE3 instruction set. MONITOR defines an address range used to monitor write-back stores. MWAIT is used to indicate that an execution thread is waiting for data to be written to the address range defined by the MONITOR instruction. The thread can then transition into a low power state and wait to be notified by a monitor-wake event when data is written to the monitored address range.

BRIEF DESCRIPTION OF THE DRAWINGS

The present invention is illustrated by way of example and not limitation in the figures of the accompanying drawings.

DETAILED DESCRIPTION

Methods and apparatus for monitoring a cache line in a distributed cache architecture are herein disclosed. One embodiment includes an execution thread sending a MONITOR request for an address via a communication interconnect to a portion of a distributed cache that stores data corresponding to that address. This and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

Figure 1:
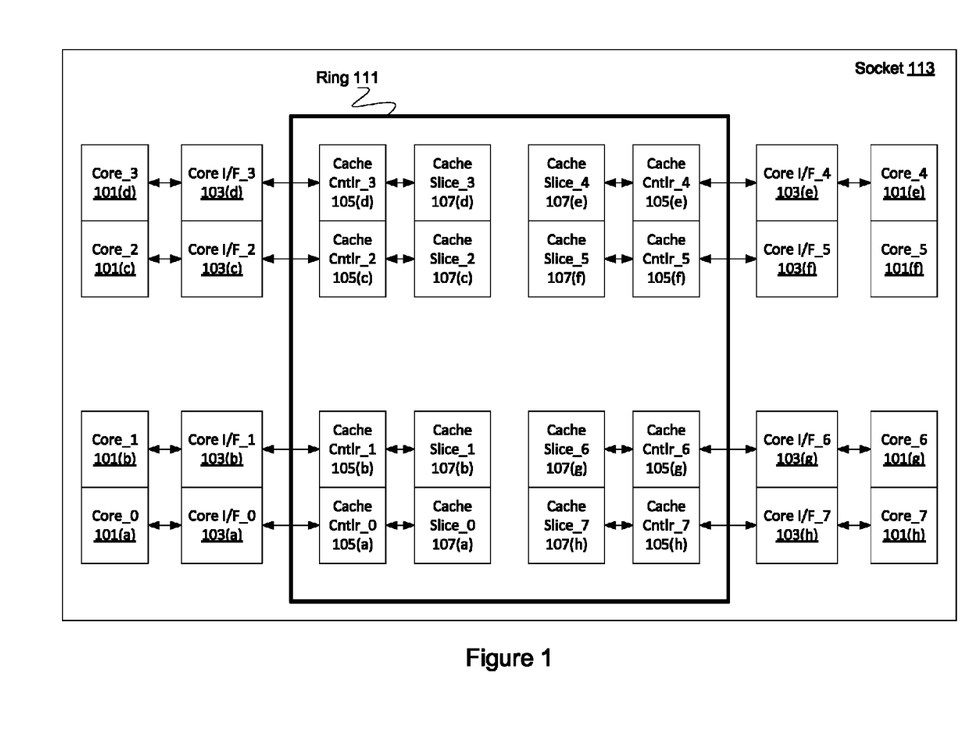
FIG. 1 illustrates an embodiment of a socket utilizing a distributed cache architecture.

FIG. 1 illustrates an embodiment of a socket utilizing a distributed cache architecture. The socket 113 includes multiple processing cores 101. Each processing core 101 includes local storage (such as an L1 data, L1 instruction, and L2 caches) that it is responsible for maintaining. Additionally, each processing core may process one or more threads.

Coupled to each processing core 101 is a core interface 103. The core interfaces act as an intermediary between a core and i) other cores in the socket and ii) distributed cache slices 107. In some embodiments, each core interface includes a MONITOR finite state machine (FSM) which will be discussed in detail below. As such, the core interfaces 103 monitor traffic flowing to/from the processing cores 101 and cache slices 107.

Co-located with each processing core 101 is a cache controller 105. These cache controllers 105 are responsible for the maintenance of a slice 107 of the distributed last level cache (LLC). Each slice is a mutually non-overlapping range of addresses of the LLC. For example, cache controller 105_3 (d) maintains the range of addresses that make up slice 107_3 (d). The LLC is inclusive of all lower levels of the cache hierarchy. That means that if a core tries to access a data item and it is not present in the LLC it will also not be present in the local caches of other cores in the same socket. The core interfaces 103 and cache controllers 105 may be logic, circuits, software, or a combination thereof.

Each of the processing cores 101 may send a MONITOR request for an address handled by a particular cache controller 105 via a bidirectional ring 111. Through the use of such monitoring, the thread that requested the monitor may be put to sleep and its state saved until it is awakened. For example, the thread calls for a MONITOR request, stores its state in a context if the core is powering off, goes to sleep, and is awakened when there is a change in the line that it requested be monitored so that it will be awakened by a specific store event on another thread. These requests may be received by the appropriate core interface 103 (the core interface co-located to a core) and/or the appropriate cache controller 105. There are eight stops on the ring 111 (one for each processing core 101). In an embodiment, data moves across the ring 111 at one stop per clock. If any processing core 101 needs data from any other cache, it is no more than several ring hops to the right cache slice. To pull data off the ring, each stop pulls one message off per clock.

Other components that may be included in a socket 113 such as a memory controller, system interface, socket-to-socket interconnect, etc. are not shown, but in many embodiments are included in the socket 113.

Figure 2:
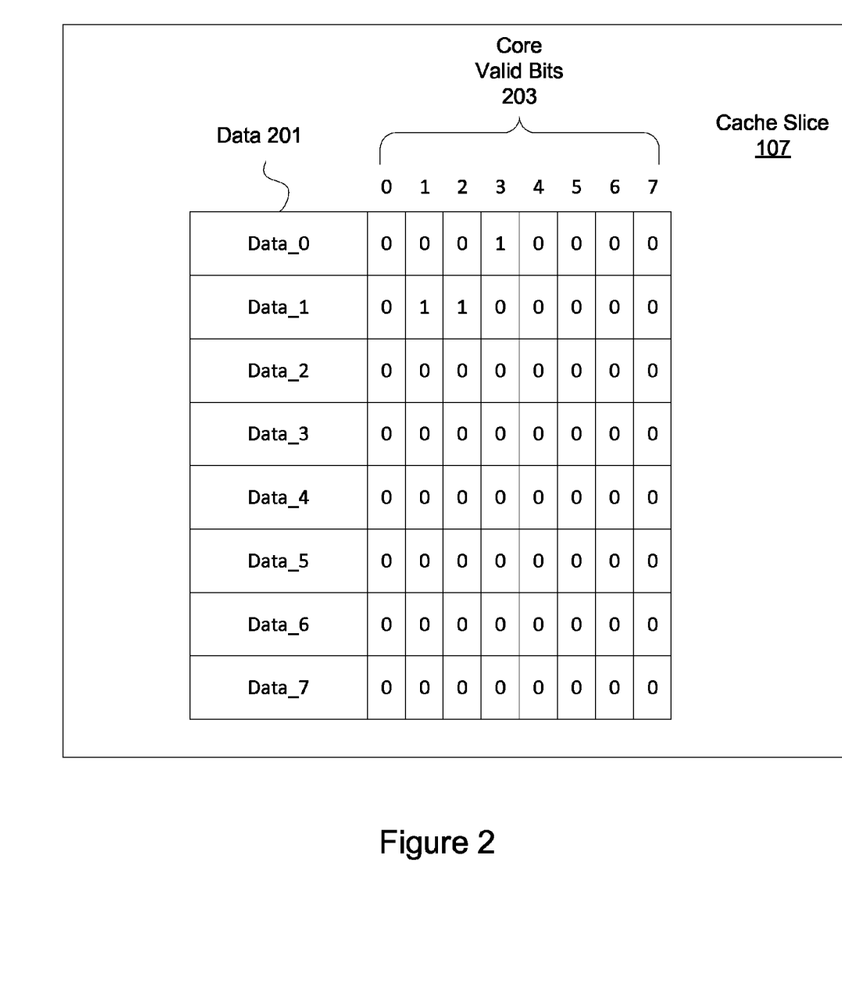
FIG. 2 illustrates an embodiment of a partial diagram of a cache line stored in a cache slice 107 of the LLC.

FIG. 2 illustrates an embodiment of a partial diagram of a cache line stored in a cache slice 107 of the LLC. Each cache line includes data 201 and a collection of core valid bits 203. If a core valid bit is set, it means that the associated core may have a copy of that cache line. In the example of FIG. 2, the second illustrated cache line has two valid bits set at positions 1 and 2. This means that cores 1 and 2 potentially have a copy of that cache line in their local caches (L1 and L2). These valid bits are utilized during the monitoring process as indicators of which core interface(s) to alert when a change has been made or requested for a particular cache line that may be monitored. In other embodiments, the core valid bits 203 are not stored with the cache lines, but stored in a separate structure. While only one bit is shown for each core, there could be any number of bits per core or the valid bits may be encoded to represent which cores may have the line. These bits are not cleared upon the receipt of a snoop miss response (RspI) for a snoop of code or data because it is a non-ownership snoop that does not trigger the below described FSM to change from the monitor to information state.

There are several conventions that a socket of FIG. 1 follows to implement monitoring of a cache line. As mentioned above, MONITOR requests are sent from a core to an addressed cache controller via the co-located core interface. These MONITOR requests cause the MONITOR FSM of the co-located core interface to transition to the WAIT state before being sent to the appropriate cache controller. The line associated with the request will be cached in the addressed LLC slice (if it has not been done already) and the core valid bit for the requesting core will be set (again, if this has not already been done). Global observation (GO) of an address is achieved when data and related coherence messages have propagated sufficiently through the system that potential observers will observe the new value if they load the affected memory location. In other words, all agents would see the new value if they performed a load operation after global observation of the store. In response to receiving a MONITOR request, a GO message is sent from the addressed cache controller to the core that requested the MONITOR. This causes the MONITOR FSM in the co-located core interface to transition from the WAIT to the MONITOR state. Additionally, a shared copy of the line being monitored is sent. No other core (e.g., the nor L2 cache of the core) may have an exclusive or modified copy of the cache line because the requester is getting a shared copy. However, the LLC (e.g., L3 cache) in the local socket may be in any state specified by the caching agent such as those enumerated by MESI, MESIF, etc. Additionally, other core valid bits may also be set for the cache line.

If a non-invalidating request is made to the monitored cache line after the MONITOR FSM has been armed, it may result in a non-invalidating snoop (such as snoop code and snoop data) to the core (and its local cache) whose thread has a pending MONITOR request, depending on the LLC state and core valid bits. If such a snoop does occur, it does not activate the MONITOR FSM regardless of whether the core responds indicating that it still retains a shared copy (e.g., response shared or RspS*) or does not (e.g., response invalid or RspI*) and the core valid bits are not cleared in the cache line being monitored. This is because if a subsequent invalidating request occurs, that request needs to activate the MONITOR FSM and the core valid bits are used to filter the core snoops. An exception to this is if the response indicates that the core had a modified copy of the line (RspIFwdM), as such it is known that there must not be any pending MONITOR, because a write has occurred to that cache line since the last MONITOR (when a MONITOR request is made, it will cause the snooping of any core that potentially has a modified copy, including the requester).

If an invalidating request is made to the monitored cache line from any core other than the core whose thread has the MONITOR request, it will result in an invalidating snoop (SnpInv) to the core requesting the MONITOR (since the corresponding core valid bit has been set), activating the MONITOR FSM (as will be discussed below). A response to such a snoop may safely clear the associated core valid bit.

If an invalidating request is made to the monitored cache line from the same core that has the pending MONITOR, from the cache coherence protocol standpoint, no invaliding snoop is need, as the core can handle receiving stale data (for example the "Buried-HITM" case). It is possible for a caching node to generate a read request even if the requested block of data is in some cache level of the caching node. The data may be referred to as "Buried-HITM" data because the modified (i.e., "M") data block is buried in the cache structure of the requesting caching node and the resulting condition may referred to as a "Buried-HITM" condition. As used herein, "HITM" refers to a condition in which a caching agent responds to a snoop request with a hit to a modified ("M") line. However, the associated MONITOR FSM is still activated, since the other thread on the same core is requesting ownership, presumably to perform a write. In this case (since the corresponding core valid bit is set), a pseudo-snoop message (SnpMon) is generated, which activates the MONITOR FSM just as a SnpInv, but is not sent to the core that requested the MONITOR or tracked by the associated LLC cache controller. This allows the thread that requested the monitor of the cache line to be awakened without incurring the latency overhead of snooping the requesting cache. This may be further optimized when other core valid bits are set as well in the monitored line, by sending a SnpInv to the other "valid" cores while at the same time sending a SnpMon to the requesting core.

Figure 3:
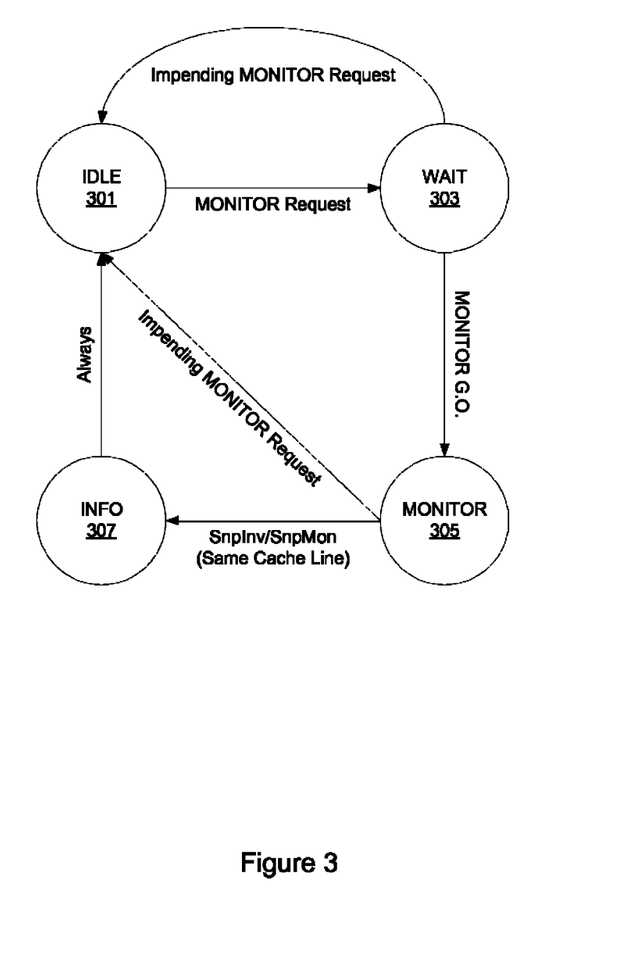
FIG. 3 illustrates an embodiment of a MONITOR FSM that utilizes one or more of the above conventions.

FIG. 3 illustrates an embodiment of a MONITOR FSM that utilizes one or more of the above conventions. In some embodiments, the FSM is a hardware circuit such as an ASIC, FPGA, etc. In other embodiments, the FSM is a software routine. As a part of this FSM, in response to invalidating requests/snoops to the monitored cache line address a core snoop, or other message, is sent to the co-located core when the FSM is potentially active to trigger a thread wakeup. As discussed above, each core interface 103 stores and maintains a version of this FSM.

Prior to any monitoring by the core interface 103 responsible for the thread requesting the monitoring, the FSM is in an idle state 301. Upon the receipt of a MONITOR request from a core at the co-located core interface 103, the FSM transitions from the idle state 301 to a wait state 303. This request is also received by the cache controller 105 that is responsible for the cache line to be monitored. For example, when processing core 3 101(*d*) issues a MONITOR for a line in slice 5 107(*f*), the core interface 103(*d*) sees the request and transitions its FSM to the wait state 303.

In the wait state 303, the receiving cache controller 105 transmits a MONITOR GO response to the requesting core when that is possible. As a part of that response, it will also send a shared copy of the line to the requesting core and set the valid bit of the requesting core in that line (if not already done). The requesting core or at least the requesting thread may go to sleep once it receives this GO response and executes a subsequent MWAIT instruction. The wait state may also transition back to the idle state 301 if a subsequent request has been made to stop monitoring the line. For example, it may have received another impending request that supersedes the first request.

Once the MONITOR GO response has been sent the FSM transitions to the monitor state 305. In this state, the FSM watches the cache line address for an invalidating snoop which will trigger thread wakeup. Upon receiving an invalidating snoop (SnpInv) or pseudo-snoop (SnpMon) to the watched address, the FSM transitions to an info state 309 where a thread wakeup event will be sent to the core that requested the monitoring. The FSM may also transition back to the idle state 301 upon an impending request to the addressed line.

Figure 4:
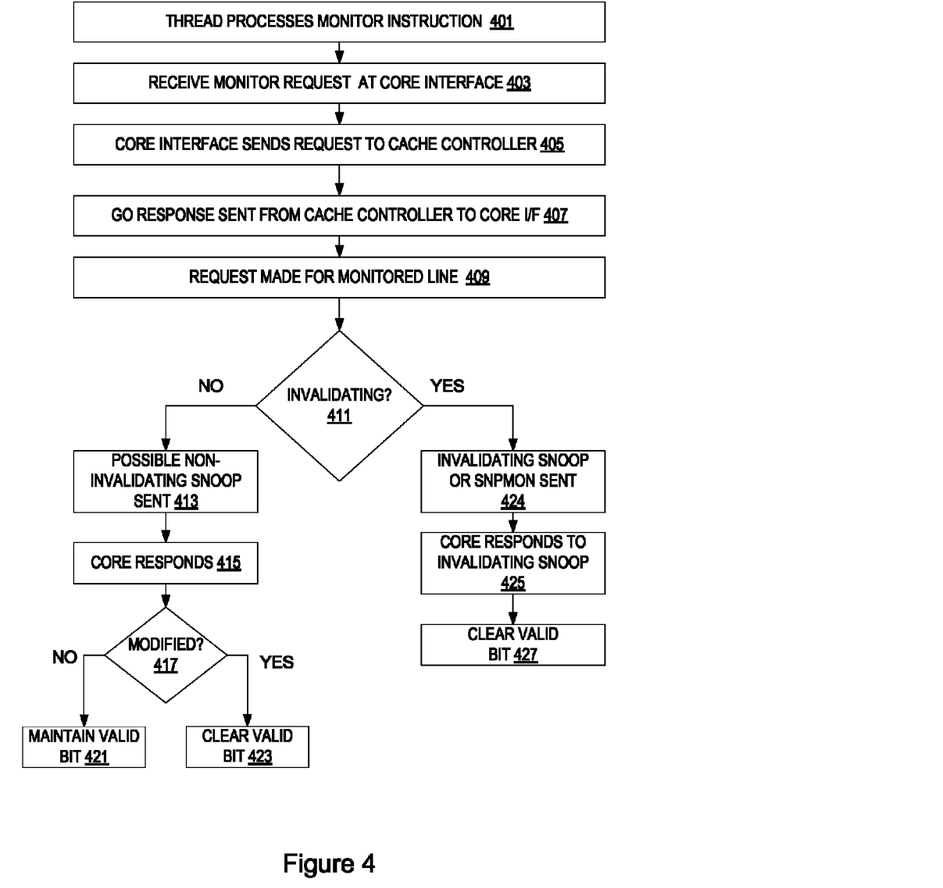
FIG. 4 illustrates an embodiment of a method of operation of the socket utilizing a distributed cache architecture.

FIG. 4 illustrates an embodiment of a method operation of the socket utilizing a distributed cache architecture. At 401, a thread processes a MONITOR instruction requesting that a line of cache in a distributed LLC be monitored. This instruction is received by the core's co-located core interface at 403.

For example, core_3 101(*d*) has a thread that processed a MONITOR instruction. The co-located core interface 103(*d*) receives a monitor request from the core due to this processing. The FSM of the core interface transitions to a wait state.

At 405, the co-located core interface forwards this request to the cache controller that is responsible for the cache line to be monitored. For example, the co-located core interface 103(*d*) sends such a request to cache controller_1 105(*b*).

The cache controller that receives the request processes the request and sends a MONITOR GO response to the co-located core interface that made the request at 407. For example, cache controller_1 105(*b*) processes the MONITOR request and sends a GO response back to core interface 103(*d*). Orthogonal to the GO response, the cache controller may also send a copy of the data of the monitored cache line to the core interface that requested the monitoring. Additionally, the cache controller sets the valid bit associated with the core that requested the monitoring. The receipt of the GO response triggers the FSM of the co-located core interface that made the MONITOR request to transition to a monitor state.

At some point later in time, the cache controller responsible for the cache line being monitored will receive a request for the line at 409. Depending upon if the request is an invalidating request or not, will result in one of several actions being performed after 411.

If it is not invalidating, it may or may not result in a non-invalidating snoop to the core that requested the monitor depending on the LLC state and valid bit settings at 413. If a non-invalidating snoop was sent the core responds at 415, a determination of whether the response indicates that the core has a modified version of cache line (such as a RspIFwdM response) is made at 417. If a snoop does occur, it does not activate the FSM of the core interface. If the response was a RspIFwdM response, the valid bit associated with that core is cleared at 423. If the response was a RspI* or RspS*, then the core valid bit will not be cleared at 421 as discussed earlier.

If the request is an invalidating one, an invalidating snoop (SnpInv) or pseudo-snoop (SnpMon) is sent at 424. If the core that made the request is the same one that made the monitor request at 409, then the FSM will be activated by the SnpMon sent from the cache controller to transition the FSM from MONITOR to INFO. No response will come back from the core interface for a SnpMon. If the request came from a different core, then a SnpInv is sent to the core that requested the monitoring and the FSM changes from MONITOR to INFO. The core responds to that SnpInv at 425 and the core's valid bit is cleared at 427 as discussed above.

Figure 5:
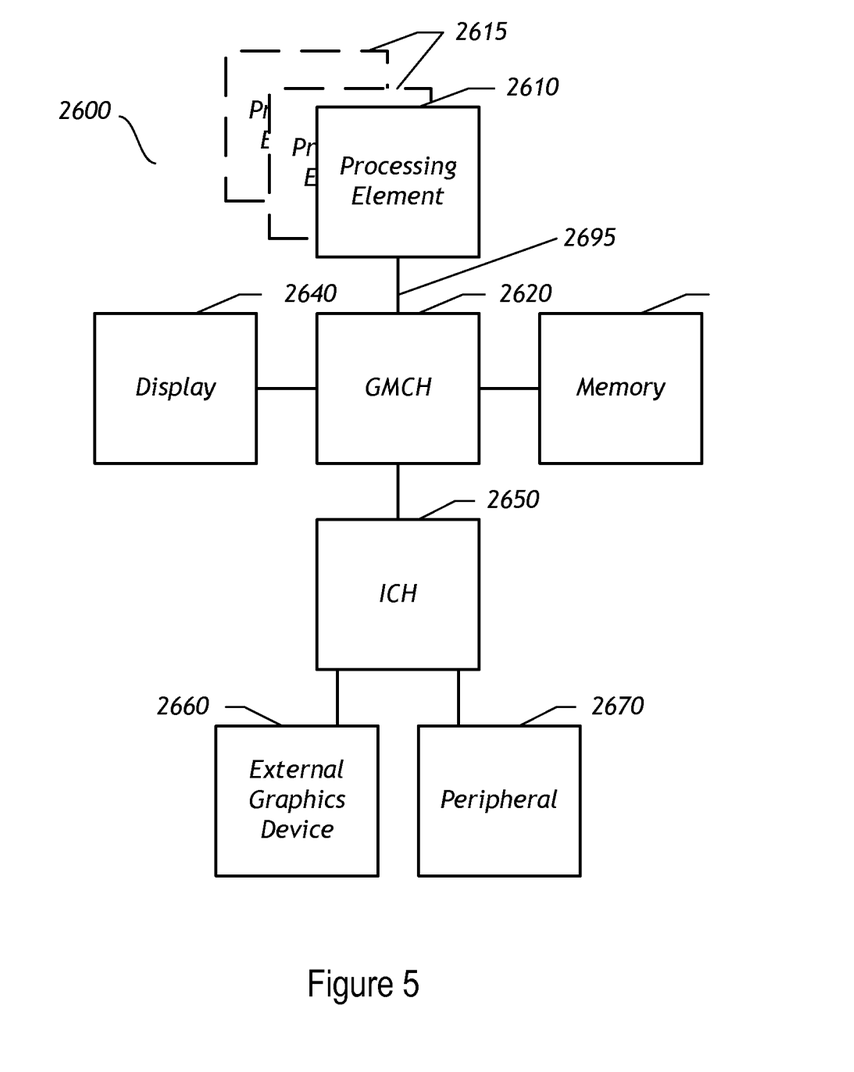
FIG. 5 shows a block diagram of a system in accordance with one embodiment of the present invention.

Referring now to FIG. 5, shown is a block diagram of a system 500 in accordance with one embodiment of the present invention. The system 500 may include one or more processing elements 510, 515, which are coupled to graphics memory controller hub (GMCH) 520. The optional nature of additional processing elements 515 is denoted in FIG. 5 with broken lines.

Each processing element may be a single core or may, alternatively, include multiple cores. The processing elements may, optionally, include other on-die elements besides processing cores, such as integrated memory controller and/or integrated I/O control logic. Also, for at least one embodiment, the core(s) of the processing elements may be multi-threaded in that they may include more than one hardware thread context per core.

FIG. 5 illustrates that the GMCH 520 may be coupled to a memory 540 that may be, for example, a dynamic random access memory (DRAM). The DRAM may, for at least one embodiment, be associated with a non-volatile cache.

The GMCH 520 may be a chipset, or a portion of a chipset. The GMCH 520 may communicate with the processor(s) 510, 515 and control interaction between the processor(s) 510, 515 and memory 540. The GMCH 520 may also act as an accelerated bus interface between the processor(s) 510, 515 and other elements of the system 500. For at least one embodiment, the GMCH 520 communicates with the processor(s) 510, 515 via a multi-drop bus, such as a frontside bus (FSB) 595.

Furthermore, GMCH 520 is coupled to a display 540 (such as a flat panel display). GMCH 520 may include an integrated graphics accelerator. GMCH 520 is further coupled to an input/output (I/O) controller hub (ICH) 550, which may be used to couple various peripheral devices to system 500. Shown for example in the embodiment of FIG. 5 is an external graphics device 560, which may be a discrete graphics device coupled to ICH 550, along with another peripheral device 570.

Alternatively, additional or different processing elements may also be present in the system 500. For example, additional processing element(s) 515 may include additional processors(s) that are the same as processor 510, additional processor(s) that are heterogeneous or asymmetric to processor 510, accelerators (such as, e.g., graphics accelerators or digital signal processing (DSP) units), field programmable gate arrays, or any other processing element. There can be a variety of differences between the physical resources 510, 515 in terms of a spectrum of metrics of merit including architectural, microarchitectural, thermal, power consumption characteristics, and the like. These differences may effectively manifest themselves as asymmetry and heterogeneity amongst the processing elements 510, 515. For at least one embodiment, the various processing elements 510, 515 may reside in the same die package.

Figure 6:
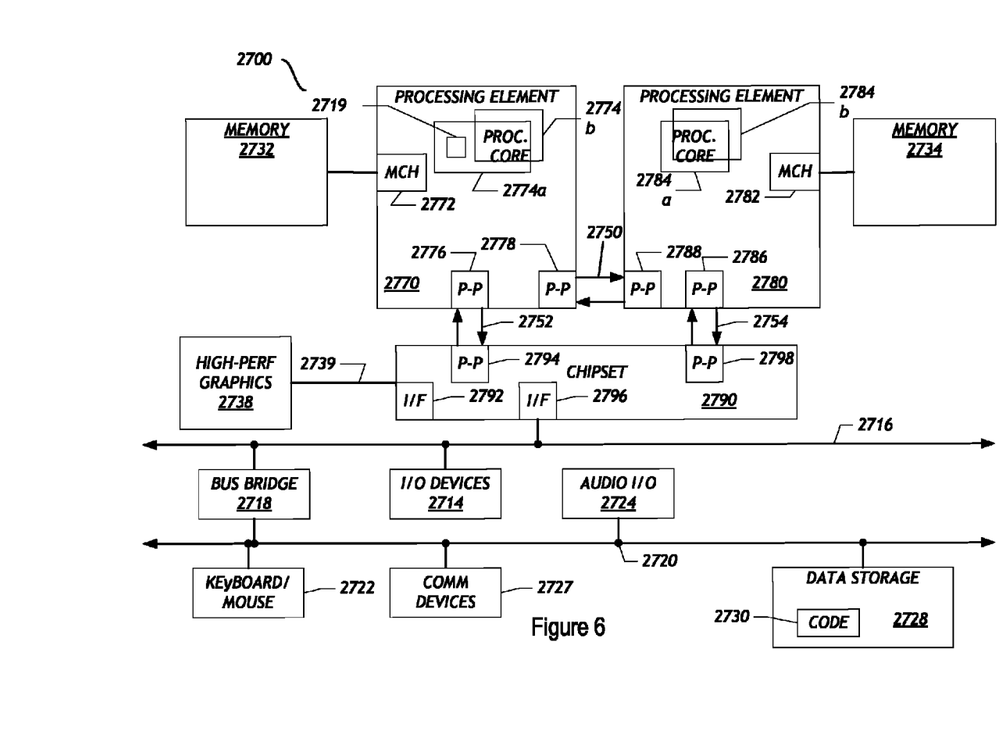
FIG. 6 shows a block diagram of a system in accordance with an embodiment of the present invention.

Referring now to FIG. 6, shown is a block diagram of a second system 600 in accordance with an embodiment of the present invention. As shown in FIG. 6, multiprocessor system 600 is a point-to-point interconnect system, and includes a first processing element 670 and a second processing element 680 coupled via a point-to-point interconnect 650. As shown in FIG. 6, each of processing elements 670 and 680 may be multicore processors, including first and second processor cores (i.e., processor cores 674*a* and 674*b* and processor cores 684*a* and 684*b*).

Alternatively, one or more of processing elements 670, 680 may be an element other than a processor, such as an accelerator or a field programmable gate array.

While shown with only two processing elements 670, 680, it is to be understood that the scope of the present invention is not so limited. In other embodiments, one or more additional processing elements may be present in a given processor.

First processing element 670 may further include a memory controller hub (MCH) 672 and point-to-point (P-P) interfaces 676 and 678. Similarly, second processing element 680 may include a MCH 682 and P-P interfaces 686 and 688. Processors 670, 680 may exchange data via a point-to-point (PtP) interface 650 using PtP interface circuits 678, 688. As shown in FIG. 6, MCH's 672 and 682 couple the processors to respective memories, namely a memory 642 and a memory 644, which may be portions of main memory locally attached to the respective processors.

Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639. Embodiments of the invention may be located within any processor having any number of processing cores, or within each of the PtP bus agents of FIG. 6. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode.

First processing element 670 and second processing element 680 may be coupled to a chipset 690 via P-P interconnects 676, 686 and 684, respectively. As shown in FIG. 6, chipset 690 includes P-P interfaces 694 and 698. Furthermore, chipset 690 includes an interface 692 to couple chipset 690 with a high performance graphics engine 648. In one embodiment, bus 649 may be used to couple graphics engine 648 to chipset 690. Alternately, a point-to-point interconnect 649 may couple these components.

In turn, chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present invention is not so limited.

As shown in FIG. 6, various I/O devices 614 may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Note that other architectures are possible. For example, instead of the point-to-point architecture of FIG. 6, a system may implement a multi-drop bus or other such architecture.

Figure 7:
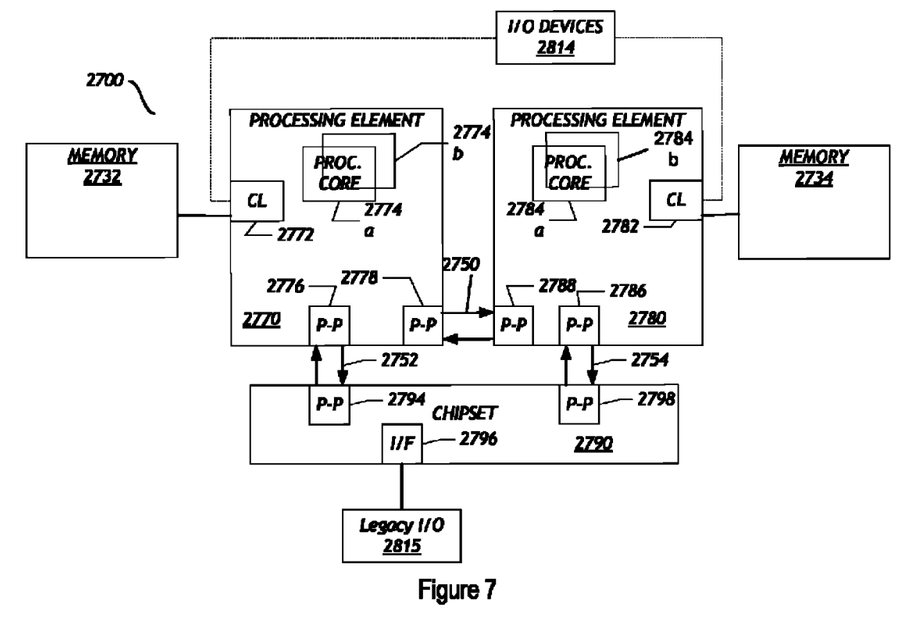
FIG. 7 shows a block diagram of a system in accordance with an embodiment of the present invention.

Referring now to FIG. 7, shown is a block diagram of a third system 700 in accordance with an embodiment of the present invention. Like elements in FIGS. 6 and 7 bear like reference numerals, and certain aspects of FIG. 6 have been omitted from FIG. 7 in order to avoid obscuring other aspects of FIG. 7.

FIG. 7 illustrates that the processing elements 670, 680 may include integrated memory and I/O control logic ("CL") 672 and 682, respectively. For at least one embodiment, the CL 672, 682 may include memory controller hub logic (MCH) such as that described above in connection with FIGS. 5 and 6. In addition. CL 672, 682 may also include I/O control logic. FIG. 7 illustrates that not only are the memories 642, 644 coupled to the CL 672, 682, but also that I/O devices 714 are also coupled to the control logic 672, 682. Legacy I/O devices 715 are coupled to the chipset 690.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code, such as code 630 illustrated in FIG. 6, may be applied to input data to perform the functions described herein and generate output information. Accordingly, embodiments of the invention also include machine-readable media containing instructions for performing the operations embodiments of the invention or containing design data, such as HDL, which defines structures, circuits, apparatuses, processors and/or system features described herein. Such embodiments may also be referred to as program products.

Such machine-readable storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents.

We claim:

1. An apparatus comprising:
a first and second processing core, wherein the first and second processing cores to each process a first and second thread respectively;
a first and second distributed cache slice to store data for either or both of the first and second processing cores; and
a first and second core interface co-located with the first and second processing cores respectively, each core interface to maintain a finite state machine (FSM) to be executed in response to receiving a request from a thread of its co-located processing core to monitor a cache line in the distributed cache, wherein the FSM comprises:
a wait state to record a request from a co-located core's thread to monitor a specific cache line,
a monitor state to monitor for a pseudo-snoop of the cache line being monitored, wherein the pseudo-snoop activates the FSM, but is not sent to the core that requested the monitoring of the cache line, and an information state to send a wakeup event to the thread that requested the monitoring of the cache line.

2. The apparatus of claim 1, further comprising:
a ring interconnect coupled to the first and second core interfaces, the ring interconnect to pass messages between the first and second core interfaces and the first and second cache slices.

3. The apparatus of claim 1, further comprising:
a first and second cache controller coupled to the first and second distributed cache slices respectively, the cache controller to maintain its distributed cache slice.

4. The apparatus of claim 1, wherein the distributed cache is inclusive of any cache of the first and second processing cores and wherein each line of the cache tracks which processing cores potentially have a copy of the cache line.

5. The apparatus of claim 1, wherein a cache line of the first and second distributed cache slices comprises:
data; and
two valid bits to indicate if the first and second cores potentially have a shared copy of the cache line.

6. The apparatus of claim 1, wherein the first and second distributed cache slices comprise:
a plurality of cache lines of data; and
separately stored valid bits for each cache line to indicate if the first and second cores potentially have a shared copy of the cache line.

7. A system comprising:
a processor comprising:
a first and second processing core, wherein the first and second processing cores to process a first and second thread respectively,
a first and second distributed cache slice to store data for either or both of the first and second processing cores, and
a first and second core interface co-located with the first and second processing cores respectively, each core interface to maintain a finite state machine (FSM) to be executed in response to receiving a request from a thread of its co-located processing core to monitor a cache line in the distributed cache, wherein the FSM comprises:
a wait state to record a request from a co-located core's thread to monitor a specific cache line,
a monitor state to monitor for a pseudo-snoop of the cache line being monitored, wherein the pseudo-snoop activates the FSM, but is not sent to the core that requested the monitoring of the cache line, and
an information state to send a wakeup event to the thread that requested the monitoring of the cache line; and
a display coupled to the processor.

8. The system of claim 7, further comprising:
a ring interconnect coupled to the first and second core interfaces, the ring interconnect to pass messages between the first and second core interfaces.

9. The system of claim 7, further comprising:
a first and second cache controller coupled to the first and second distributed cache slices respectively, the cache controller to maintain its distributed cache slice.

10. The system of claim 7, wherein the distributed cache is inclusive of any cache of the first and second processing cores and wherein each line of the cache tracks which processing cores potentially have a copy of the cache line.

11. The system of claim 7, wherein a cache line of the first and second distributed cache slices comprises:
data; and
two valid bits to indicate if the first and second cores potentially have a shared copy of the cache line.

12. The system of claim 7, wherein the first and second distributed cache slices comprise:
a plurality of cache lines of data; and
separately stored valid bits for each cache line to indicate if the first and second cores potentially have a shared copy of the cache line.

* * * * *